United States Patent [19]

Colozzi et al.

[11] Patent Number: 4,847,998
[45] Date of Patent: Jul. 18, 1989

[54] CAKE CUTTER

[75] Inventors: Italo E. Colozzi, Cranston; Sandi Gilbert, East Greenwich, both of R.I.

[73] Assignee: Rawl Engineering & Mfg. Co., Inc., Providence, R.I.

[21] Appl. No.: 618,545

[22] Filed: Jun. 8, 1984

[51] Int. Cl.⁴ .............................................. A21C 5/08
[52] U.S. Cl. ..................................................... 30/114
[58] Field of Search .................. 30/114, 302, 303, 124

[56] References Cited

U.S. PATENT DOCUMENTS 593,386  11/1897  Williams .......................... 30/114 X
2,264,486  12/1941  Smith ................................ 30/114 X
2,800,714  7/1957  Evans .................................. 30/114

FOREIGN PATENT DOCUMENTS 2481185  10/1981  France ................................. 30/114

Primary Examiner—Douglas D. Watts
Assistant Examiner—William Fridie, Jr.
Attorney, Agent, or Firm—Barlow & Barlow

[57] ABSTRACT

A cake cutter is disclosed that has a vertical blade with an outline of an isosceles triangle. The base wall of the blade is in two parts, a handle beign affixed to each part, the two legs of the handle being joined by an arcuate spring section.

2 Claims, 1 Drawing Sheet

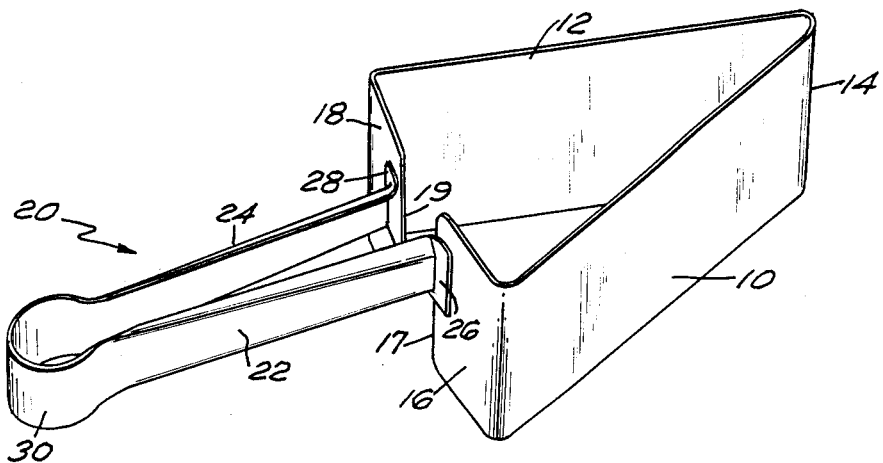
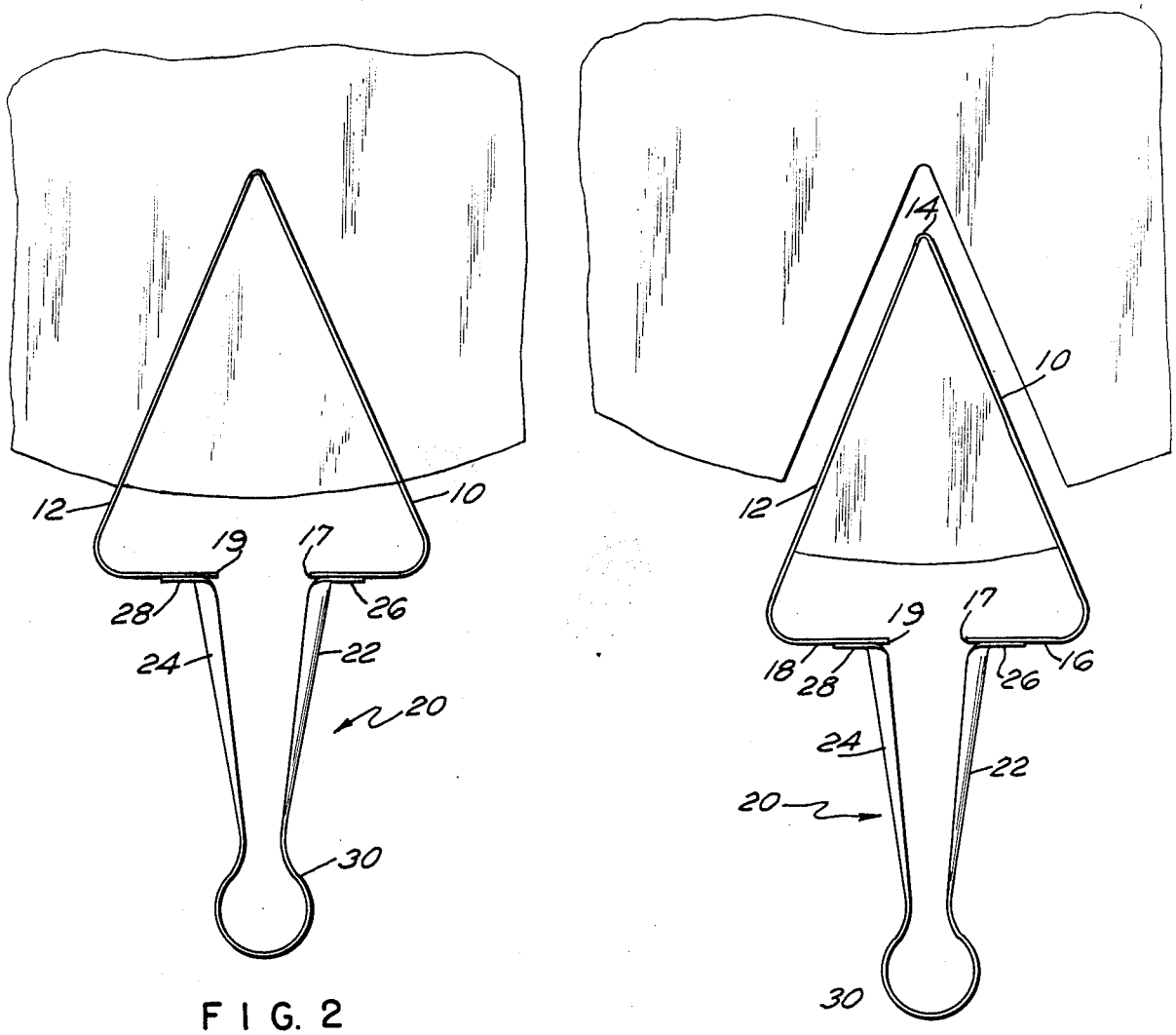

CAKE CUTTER

BACKGROUND OF THE INVENTION

This invention relates to an improved cake cutter which provides a simple but efficient device by means which a cake can be conveniently cut and then served without the same upsetting.

In the past cake cutters have been provided in the form of spatulas and also as seen in the Smith patent, U.S. Pat. No. 2,264,486 have been formed of vertical blades. One of the difficulties that comes about in utilizing a construction such as shown in Smith resides in the fact that the handles are free of each other and this will distort the blades from a closure on the same plane under certain circumstances.

It is therefore an object of this invention to provide a cake cutter which may be made from a unitary one-piece blade and a one-piece handle which will insure movement of the blades on one plane. A further object of the invention is to provide a unitary cake cutter which may be made entirely of metal, as for example, stainless steel, that may be readily cleaned and maintained sanitary.

The invention provides, therefore, a cake cutter that has a unitary vertical blade of uniform height that is fashioned in the form of an isosceles triangle and which would have two separate base portions that have terminal edges that are spaced from each other. A handle extends rearwardly from the base portions, the handle consisting essentially of a pair of arms that are joined at the far end by an arcute spring section.

BRIEF DESCRIPTION OF THE DRAWINGS

FIG. 1 is a perspective view of my invention;

FIG. 2 is a top view illustrating the cutter penitrating a cake; and

FIG. 3 is a view similar to FIG. 2 showing the slice cut and being removed from the cake.

DETAILED DESCRIPTION OF THE PREFERRED EMBODIMENT

Referring now to FIG. 1, the cake cutter consists of a unitary blade formed of a single strip of sheet metal, providing a first side wall 10 and an equal and opposite side wall 12, the walls joined together at an apex 14. As a continuation of the sides 10 and 12, there are two base wall portions 16 and 18 which extend inwardly to each other opposite the apex 14, the terminal edges 17 and 19 respectively being spaced from each other. Essentially the cake cutter has a single thin sharp vertical blade of sheet metal which may be steel suitably plated, or stainless steel, and is formed triangular in plan, a space between the base portion terminal edges being provided so that inwardly movement of the base wall may be had.

A handle 20 is provided, the handle consisting of a pair of arcuate arms 22, 24, which have at one end tabs 26, 28 respectively that are welded or suitably secured to the base wall portions 16 and 18 respectively. The other end of the arms 22, 24 are joined together by an arcuately bent and tensioned spring 30 which is tensioned in such a way as to cause the handles 22 and 24 to normally spring apart. In addition, the apex 14 of the blade may be bent in such a way that it normally will tension the walls 10 and 12 apart so that between the arcuate tension spring portion 30 and the apex 14, the cutter device is maintained in an open spread-apart position as seen in FIG. 1 at all times.

Referring to FIG. 2, it will be seen that the device may be readily pressed downwardly into a piece of cake, and once it has been pressed through the cake, the handles may be squeezed together and the slice of cake may be readily removed as seen in FIG. 3 of the drawings. The cake may then be transported to a serving dish or the like, and the pressure operating on the handles may be released so that the portion of cake may readily slip from the cutter.

It will be seen that there has been provided a simple yet efficient cake cutter which can be made by forming sheet metal, preferably of stainless steel, that may be maintained sanitary for use over and over again.

I claim:

1. A two part cake cutter having a first part comprising a unitary vertical blade of uniform height formed in the shape of an isosceles triangle with two equal flat side walls and two planar base wall portions, said base portions having spaced terminal edges, and having a second part comprising a unitary handle having two arms joined at one end by an integral tensioned arcuate self-opening spring section, each arm having a partially arcuate face to provide a comfortable grip, each arm extending away from and secured to one of the planar base wall portions at a position where the arms substantially align with the said terminal edges whereby the two side walls are normally spread apart by the spring action of the handle and may be brought together by squeezing the handle.

2. A cake cutter as in claim 1 wherein the free end of the arms have outwardly bent tabs that are secured to the base portions.

* * * * *